Patented Apr. 12, 1927.

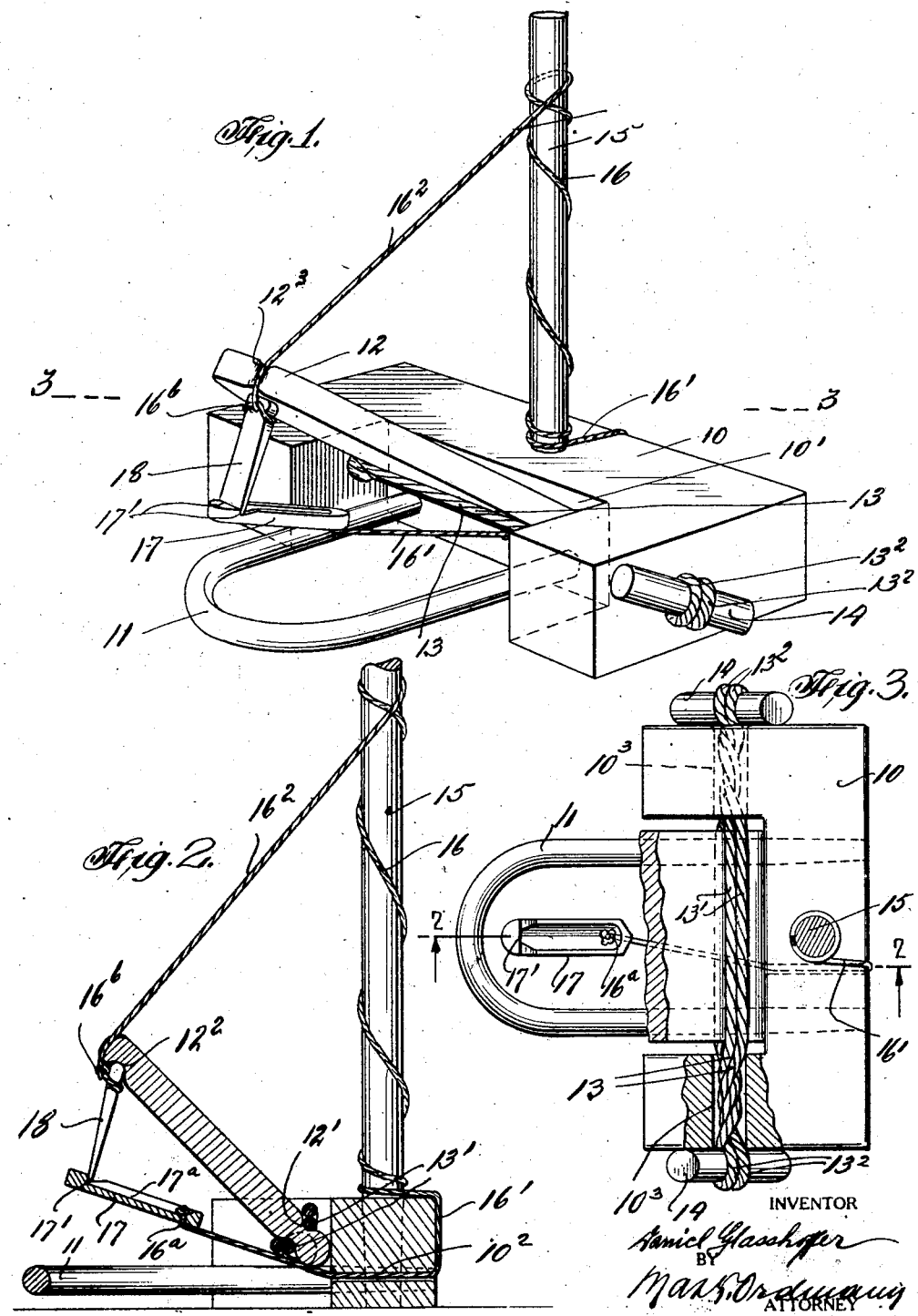

1,624,548

UNITED STATES PATENT OFFICE.

DANIEL GLASSHOFFER, OF ROSELLE, NEW JERSEY.

ANIMAL TRAP.

Application filed September 2, 1926. Serial No. 133,210.

The present invention relates to animal traps, particularly mouse or rat traps and has for its object to provide a trap which will be simple in construction, effective, durable and cheap to manufacture.

With this object in view my invention consists in the particular novel construction, combination and arrangement of parts as will be hereinafter more fully described and defined in the appended claims.

In the accompanying drawing which forms part of this specification and in which similar reference characters denote corresponding parts—

Fig. 1 is a perspective view of the trap;

Fig. 2 is a vertical section on line 2—2 of Fig. 3; and

Fig. 3 is a cross section on line 3—3 of Fig. 1.

In the drawing 10 denotes a U-shaped base. Projecting forwardly from within the recess $10^1$ of said base advantageously at a slight elevation from the lower face of the base is a horseshoe shaped member or loop 11 which constitutes a stationary jaw. This jaw is adapted to cooperate with a movable plate or jaw 12 which at its rear edge is adapted to be resiliently and pivotally supported in the base 10 to swing vertically on a transverse axis. To render the device durable and simple and to avoid springs I employ the following contrivance for the pivotal and resilient support of said movable jaw. Stretched longitudinally through the recess $10^1$ is a piece of rope or similar flexible means 13 doubled upon itself. The ends of two parallel strands $13^1$ of said rope are passed through bores $10^3$ provided in the side walls of the recess and are looped around and tied to arms or rods 14 as at $13^2$. The length of the strands of the rope is slightly larger than that of the base so that when the rods 14 are attached to the ends thereof the rope will be stretched taut. The rear end of the plate 12 is grooved transversely on its opposite faces, the grooves $12^1$ being rounded and serving to engage the stretched strands of the rope 13 and thereby support said jaw like on pivots. After the engagement of the rear part of the plate between said two strands $13^1$ of the rope one or both ends of the latter are twisted by means of the handles 14 as a result of which a strong torsional force is applied to the plate which tends to swing the latter rapidly around the central longitudinal axis of the rope bringing it into closing position. To retain the plate 12 in open or inoperative position, that is, with its forward end raised from the stationary jaw 11 like an open mouth, I provide the following simple but very effective trigger like contrivance. Projecting centrally from the base is a vertical post 15 around which is wound in a serpentine manner a strong cord or other flexible means. The part $16^1$ extending from the lowermost loop of this cord 16 is folded over the rear edge of the base, passed through a central transverse bore $10^2$ and has attached to its free end $16^a$ one end of a rigid trough shaped or longitudinally grooved member 17 formed at its opposite end with an abutment $17^1$. The groove $17^a$ of said member 17 serves to hold bait. The part $16^2$ extending from the uppermost loop of the cord 16 has attached to its free end $16^b$ a wedge shaped member 18 whose inner thicker end is adapted to engage a notch $12^2$ provided at the forward edge of the lower face of the plate 12 while the free thinner end of the wedge 18 for propping purposes is adapted to be brought into frictional engagement with the abutment $17^1$ of the member 17 and in cooperation therewith to act as a trigger. For the purpose of retaining said member 18 against lateral displacement a rounded notch $12^3$ is provided in the central part of the front edge of said plate in which the part $16^2$ is guided when the member 18 is positioned in the notch $12^2$.

The use of a cord is preferable to that of wire because the former is more stretchable than wire so that the relative position of the two members 17, 18 required for the frictional engagement thereof can be more readily adjusted after the cord has been looped around the post 15. By the engagement of the members 17 and 18 with one another the plate 12 will be held in open position against the tension of the torsioned rope 13. Just as soon as the member 17 is depressed, as it will be when touched by the animal seeking to reach the bait deposited thereon, it will release the member 18, as a result of which the jaw by the torsional force exerted on its rear part will be very rapidly thrust into closing position effectively entrapping the animal.

What I claim is:—

1. In an animal trap, a base, a jaw torsionally suspended from said base so as to have the tendency to swing into trapping position, a flexibly suspended bait holder and a flexibly suspended latch member adapted to be interposed between said bait holder and said jaw to hold the latter in open position until its release from said bait holder upon the depression of the latter by the animal.

2. In an animal trap, a base, a jaw, a pair of flexible parallel strands carried by said base and adapted to torsionally engage between themselves said jaw so that the latter will have the tendency to swing into trapping position, a flexibly suspended bait holder, and a flexibly suspended latch member adapted to be interposed between said bait holder and said jaw to hold the latter in open position until its release from said bait holder upon the depression of the latter by the animal.

3. In an animal trap, a base, a jaw torsionally suspended from said base to have the tendency to swing into trapping position, a bait holder, a latch member adapted to be interposed between and to frictionally engage said bait holder and said jaw to hold the latter in open position until its release from said bait holder upon the depression of the latter by the animal and a common flexible means for adjustably suspending said bait holder and said latch member from the base.

In testimony whereof I affix my signature.

DANIEL GLASSHOFFER.